Aug. 15, 1967 D. W. SEILING 3,336,046
PEDALLESS BICYCLE
Filed Sept. 27, 1965 2 Sheets-Sheet 1
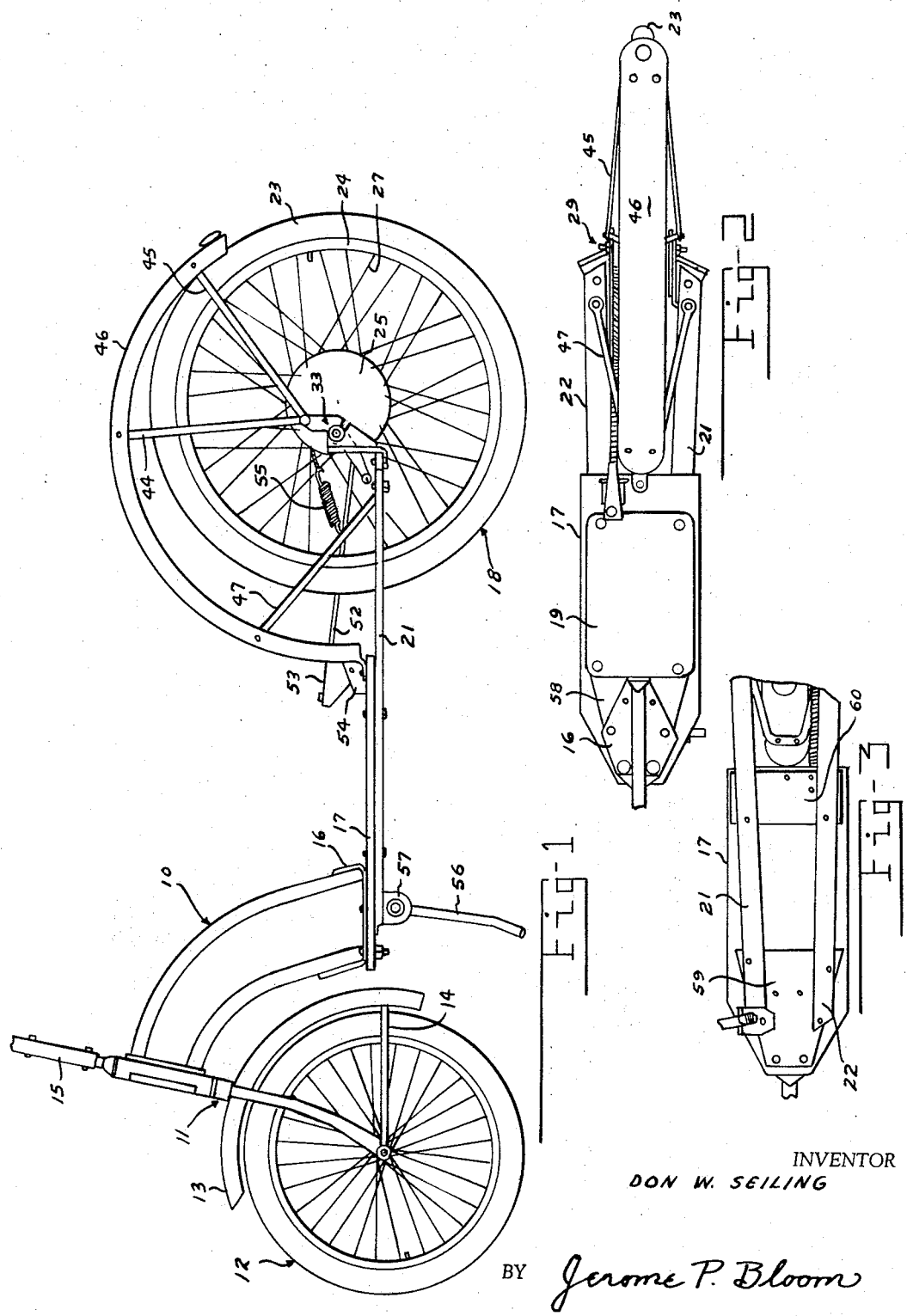
INVENTOR
DON W. SEILING
BY Jerome P. Bloom
ATTORNEY Aug. 15, 1967  D. W. SEILING  3,336,046
PEDALLESS BICYCLE
Filed Sept. 27, 1965  2 Sheets-Sheet 2
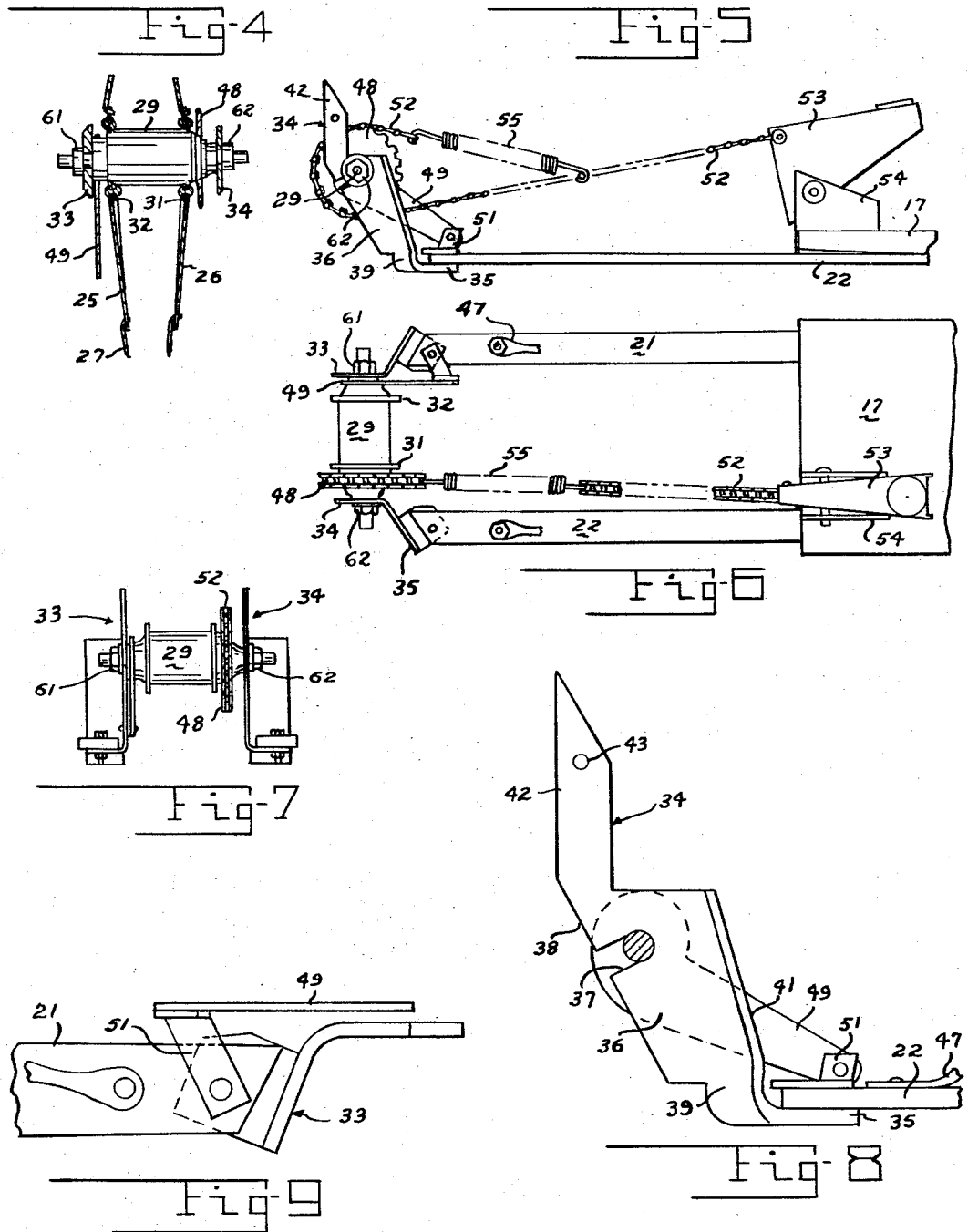
INVENTOR
DON W. SEILING
BY Jerome P. Bloom
ATTORNEY

# United States Patent Office 3,336,046
Patented Aug. 15, 1967

3,336,046
PEDALLESS BICYCLE
Don W. Seiling, 128 Grafton Ave.,
Dayton, Ohio 45406
Filed Sept. 27, 1965, Ser. No. 490,307
16 Claims. (Cl. 280—229)

ABSTRACT OF THE DISCLOSURE

A pedalless bicycle having novel means for the transmission of motive power from a reciprocable platform to a driving wheel, utilizing simple and inexpensive parts comprised in the main of standard bicycle type parts and providing means for the simplified assembly and adjustment thereof.

---

This invention relates to bicycles and particularly to pedalless, platform bicycles.

The object of the invention is to simplify the construction as well as the means and mode of operation of such bicycles, whereby these bicycles may not only be economically manufactured, but will be more efficient and satisfactory in use, adaptable to a wide variety of application and be unlikely to get out of order.

A further object of the invention is to provide a bicycle of the kind described made particularly feasible for economical manufacture and service through a general use of standard bicycle parts.

Another object of the invention is to enable a use of low cost, unformed, flat springs, in such a manner to provide optimal power for propelling the platform type bicycle.

A further object of the invention is to provide, in a bicycle of the type described, a transmission of power to its driving wheel through discs centered on the wheel and through suspension brackets formed with multiple surfaces for a convenient, efficient rotation of said discs from the above mentioned flat springs.

Still another object of the invention is to utilize a conventional brake-axle device on the driving wheel, with the brake applying means including a yielding connection automatically to release the brake and to obviate the creation of slack.

A still further object of the invention is to provide for simplified assembly and adjustment of the bicycle, having particular regard to the brake system, and to alignment of the rear wheel.

A further object of the invention is to provide a bicycle of the type described possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a partial view, in side elevation, of a bicycle in accordance with the illustrated embodiment of the invention, a part of the steering column and the handlebars being omitted;

FIG. 2 is a fragmentary top view of the bicycle of FIG. 1, the front wheel and associated parts being omitted;

FIG. 3 is a detail view of the underside of the platform portion of the bicycle of FIG. 1;

FIG. 4 is a detail view in rear elevation of a brake-axle device on the bicycle driving wheel, parts mounted on the device being shown in cross section;

FIG. 5 is a detail view, in side elevation, of brake actuating mechanism associated with the driving wheel;

FIG. 6 is a top plan view of the mechanism of FIG. 5;

FIG. 7 is a rear end view of the mechanism of FIG. 5;

FIG. 8 is an enlarged view, in side elevation, featuring one of the bracket means which transmit power to the driving wheel, parts being removed to show the brake arm in an enlarged form; and FIG. 9 is a top plan view showing the other bracket means and associated parts.

Like parts are indicated by similar characters of reference throughout the several views.

Referring to the drawings, a bicycle in accordance with the illustrated embodiment of the invention comprises a two-part tubular frame 10 terminating at one end in a fork member 11 which at its lower end mounts a front wheel 12. A fender 13 is mounted between the legs of the fork member 11 and strengthened by braces 14 to overlie upper and rearwardly directed portions of the wheel 12. An extension 15 of the fork member 11 projects upwardly and in a manner not here shown mounts a stem and handlebar assembly, serving steering and stabilizing functions.

The opposite or lower end of the frame 10 is attached, through an adapter 16, to one end of a riding platform 17. The latter is a relatively stiff, board-like member made of plywood or the like and disposed longitudinally of the bicycle between the front wheel 12 and a rear wheel 18. The rider of the bicycle stands on the platform 17, the upper side of the platform being provided with a mat 19. On the underside of the platform, in laterally spaced relation to one another are flat, rearwardly divergent, leaf type springs 21 and 22. These have a relatively long bearing against the underside of the platform 17 and are bolted or otherwise secured thereto at longitudinally spaced locations. Rearwardly of the platform 17, the flat springs 21 and 22 project divergently of one another into an embracing relation to the wheel 18. The flat springs are disposed in planes parallel to ground surface and at right angles to the principal plane of the wheel 18. Between the frame 10 and the platform 17, and between the springs 21 and 22 and the platform are sheet metal plates 58, 59 and 60 which reinforce the platform.

The wheel 18 is the driving wheel of the bicycle. It is in the main a conventional wheel comprising a tire 23 on a rim 24. A pair of discs 25 and 26 are disposed at the center of the wheel 18 in an opposed relation to one another. Wire spokes 27 of equal length connect the discs 25 and 26 to the rim 24.

The discs 25 and 26 are identical. Each has a concavo-convex configuration with the high point on the convex side, or the "apex," offset from the centrally oriented longitudinal axis of the disc. At the location of such "apex" the disc has an opening. The discs are mounted to have their convex sides facing outwardly and are aligned with one another in the axis of the wheel 18. As a result, the described offset openings are aligned with one another and are eccentric relative to the axis of the wheel. Received in the described aligned openings is a brake-axle device 29 of a conventional kind customarily used as the brake-axle in the rear wheel of standard pedal type bicycles. Intermediate its ends the device 29 has laterally spaced apart flanges 31 and 32 to which the respective discs 25 and 26 are secured, as by riveting. The discs 25 and 26 and the brake-axle device 29 accordingly are interconnected for unison rotary motion.

The device 29 is connected to the flat springs 21 and 22, heretofore described as extending rearwardly in embracing relation to the wheel 18. The interconnecting means takes the form of brackets 33 and 34 cooperatively engaging either end of the devices 29 outwardly of respective discs 25 and 26. The brackets 33 and 34 are identical in construction except one is left hand and one is right hand. Each has an irregular configuration comprising in part a plate portion or surface 35 which is disposed parallel to ground surface and to the plane of a flat spring 21 or 22 and in an adjacent relation to the plane of the latter. The springs 21 and 22 have their rearward extremities respectively resting on a plate portion 35 and suitably secured thereto as by bolting. Another portion or surface 36 of each bracket is in a plane parallel to the principal plane of the wheel 18 and is formed with a slot 37 opening through a rearwardly facing edge 38 of the bracket. The slot 37 receives therethrough one end of the device 29 or, more particularly, is interengaged in a circumferential groove near such one end in a manner to provide support for the device 29 while inhibiting relative lateral motion. Nuts 61 and 62 secure the axle of device 29 to the brackets 33 and 34.

A portion or surface 39 interconnects portions 35 and 36 of each bracket, and, as indicated, is formed with a gusset 41 lending increased lateral rigidity to the bracket. In upwardly projecting relation to the described surface 36 of the bracket is a finger 42 having an opening 43. To either side of wheel 18 braces 44 and 45 connect at their one ends to the finger 42, through aperture 43, and connect at other ends to a fender 46 disposed in a generally overlying relation to the wheel 18. Another brace 47 extends from the fender 46 to a location near the outer end of the adjacent flat spring 21 or 22 and is bolted or otherwise secured thereto. Thus braces 44, 45 and 47 are provided in pairs, with the braces of each pair respectively cooperatively engaging a respective bracket or a respective flat spring 21 or 22. The front end of the fender 46 is suitably attached to the rear of platform 17.

As will be understood, according to the construction and arrangement of its parts the bicycle is propelled by a repeated timed flexing of the flat springs 21 and 22. Thus, after forward motion of the bicycle has been initiated by a pushing off with the foot, continued forward motion is a function of the timely downward thrust delivered by the rider against the platform 17 and attached springs 21 and 22. Such a thrust, delivered while the brake-axle device 29 is in a downward course, as shown in FIG. 1, transmits powered rotation to the wheel 18. At the end of its downward stroke, the axle passes through a dead center position and begins an upward stroke in which movmeent it is forcibly driven by the springs 21 and 22 as they recover from the rider applied downward thrust. Due to the eccentric engagement of the power transmitting means therewith, rotation of the wheel 18 is accompanied by a bodily longitudinal motion thereof accommodated by bodily shifting movements of the brackets 33 and 34 with the device 29 tending to maintain its position in the bottom of the bracket slots 37. A smooth, continuously powered propulsion of the bicycle is achieved by the rider adapting his movements to the frequency of flexure of the springs 21 and 22, applying his downward thrust upon the platform 17 just after the springs have released their energy from the previous stroke and as the axle device 29 passes into its downward phase.

The device 29 incorporates, as described, brake means including a chain sprocket 48 and a brake arm 49. In accordance with the known mode of operation of devices of this kind the brake arm 49 attaches to a relatively stationary part of the bicycle while the sprocket 48 is part of an assembly rotatably movable in the device 29 to apply and to release a brake force. The brake arm 49 is mounted at its one end on the device 29 between the disc 25 and bracket 33. The opposite end of the brake arm projects forwardly and is attached to an angle member 51 which is in turn bolted to flat spring 21 and bracket portion 35 as a part of the same operation by which the latter two elements are interconnected. The sprocket wheel 48 is encircled by a chain 52, one end of which extends forwardly and is attached to a lever 53 pivotally mounted through a bracket 54 to the platform 17. The opposite end of the chain 52 is connected to one end of a tension spring 55, the other end of which is connected to the chain at a point intermediate its ends. Under this construction and arrangement of parts, depression or rocking motion of the lever 53 in a clockwise direction, as viewed in FIG. 5, results in a pulling impulse being exerted on the chain 52 tending to rotate the assembly of which sprocket wheel 48 is a part in a counterclockwise direction (FIG. 5). This is an impulse in a direction to apply the brake or to restrain rotation of the axle 29 and thereby of the discs 25 and 26 to which it is secured for unison rotation. The lever 53 is conveniently constructed and positioned to serve as a pedal, within convenient reach of the foot of the operator or rider. Thus the brake may simply be applied by depressing the pedal lever 53 and released by removing the applied pressure. In the latter connection, the spring 55 is tensioned by pulling motion of the chain 52 as described and accordingly provides a force for automatic release of the braking pressure when the applied foot pressure to the pedal 53 is removed. Further, and bearing in mind the bodily reciprocating motion of which wheel 18 partakes in the operation of the bicycle, the spring 55 serves a further function in keeping chain 52 taut, inhibiting the formation of slack therein during those periods of operation in which the wheel 18 advances toward the platform 17.

A feature of the present invention, as heretofore noted, is the manner in which the design lends itself to the use of standard bicycle parts. Consequently a unique bicycle construction is achieved, with a distinctive manner of riding, at costs comparable to those represented in producing a conventional, pedal type bicycle. For example, both wheels, the braces, fenders, fork members, and handlebars are standard parts. In the illustrated instance the rear drive wheel is larger in diameter than the front wheel. An increase in the size of the drive wheel reduces the required frequency of the flat springs 21–22 and tends to give higher speed. However, a larger diameter wheel also involves the use of a longer wheel base to accommodate the greater bodily movements of the wheel, and with an unduly large drive wheel the bicycle is less maneuverable. Hence the selection of a drive wheel of particular diameter represents a compromise, as does the degree of selected stiffness of the springs 21 and 22, such as necessary to achieve the desired results. The springs are, as shown, unformed, to be made of low cost steel and are so dimensioned, and so supported in relation to the platform 17, as to substantially obviate overstressing.

Further, the use of wheel discs 25 and 26, and the location thereof in the center of the wheel 18, obviates the use of varying length spokes to achieve the desired eccentric action. The spokes 27 are the conventional wire spokes of the usual bicycle wheel.

The use of a tension spring in the brake system solves complex problems associated with placing a brake on the driving wheel. The solution of these problems, in addition to providing positive rear wheel braking, permits the use of a standard brake-axle device, for example, as in the illustrated instance, a Bendix Red Bank brake. This is a widely used, low cost brake or axle having serrated mounting flanges. These are the flanges 31 and 32, normally providing a means of attachment of the inner ends of the wheel spokes. They are adapted with but slight modification to accept the wheel discs 25 and 26.

The brackets 33 and 34 avoid the need for forming the rear ends of the flat springs to interengage with axle means. By using straight springs, no forging or heat treating thereof is required and the springs may be made of cold, rolled, plain carbon steel and the safety factor can be lowered. The brackets, while of irregular shape as described, may be inexpensively formed from flat sheet stock.

The bicycle may be equipped with a conventional kick stand. Thus, as shown in FIG. 1, a foot 56 depends from a bracket 57 mounted on the underside of the platform 17. The foot is pivotally adjustable in the usual manner between an extended position as shown and a retracted position folded against the underside of the platform.

One should also take particular note that the divergency of the flat springs affords an extremely stable platform for the rider.

The use of tension spring 55 to apply force in the opposite direction of applied braking force, enables rear wheel braking and permits a standard brake-axle to be employed. It does this by solving complex problems associated with placing a brake-axle on the rear wheel. These include returning the brake to off position after use, making the system easily adjustable to brake settings so that braking will commence near initial movement of the brake lever, and keeping the system taut.

By providing bolt hole clearance in the connection between the springs 21 and 22 and brackets 33 and 34, relative adjustment of the brackets in any one of longitudinal, lateral and rotational senses is possible. In this manner proper positioning and alignment of the rear wheel is provided for. Through use of a plurality of selectively usuable bolt holes the longitudinal position of the rear wheel relative to the platform may be varied, thus adapting the riding characteristics to the needs or desires of individual riders.

The simplicity of the construction and arrangement of parts makes possible delivery of the bicycle in kit form for assembly by the user. For example, the rear wheel sub-assembly can be mounted to the brackets 33 and 34 merely by sliding the axle into the slots 37.

The formed wheel discs 25 and 26 are in the illustrated instance fastened to conventional axle flanges. They may, however, be otherwise secured to the axle housing, as by having a direct press fit thereon. Either method of mounting keeps the discs rigid relative to one another whereby to facilitate installation of the spokes. Also normal length tolerances of the spokes prevail and a full transmission of brake forces is obtained.

The cone shape of the wheel discs, with its inherent yield, obviates stressing of the discs toward each other as the spokes are tightened and avoids application of excessive tensile forces to the spokes. Also, the shape of the discs keeps the resultant forces of tensile stresses in the spokes directed toward a common point at the axle to eliminate moment forces in the discs which may tend to pry the discs off the axle housing.

The springs 21 and 22, being straight and unformed, have the advantage of low cost, as noted. Additionally, they are thereby interchangeable and provide a simplified manner of mounting of the brackets 33 and 34, with ease of relative adjustment as described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. A bicycle, including a frame, a pair of wheels in tandem relation, one supported by said frame and the other being the driving wheel, a riding platform disposed between said wheels attached at its one end to said frame, said platform including flat spring means extending as the other end thereof toward cooperative relation with said driving wheel and in embracing relation thereto, a disc mounted to each side of said driving wheel centrally thereof, axle means mounted between said discs in eccentric relation to the axis of said driving wheel, said axle means and said discs being interconnected for unison rotary motion, said axle means comprising a brake which when applied inhibits rotation of said discs, means attaching said flat spring means at the other end of said platform to said discs at the location of said axle means, and means on said platform for applying said brake.

2. A bicycle according to claim 1, characterized in that said last named means includes a pivoted actuator on said platform and a chain encircling said axle means and having one end anchored and the other end attached to said pivoted actuator.

3. A bicycle according to claim 2, characterized by a tension spring incorporated in said chain applying a yielding force in a direction to release the brake and to maintain said chain free of slack.

4. A bicycle, including a frame, a pair of wheels in tandem relation, one supported by said frame and the other being the driving wheel, a riding platform disposed between said wheels attached at its one end to said frame, said platform including flat spring means extending at the other end thereof toward cooperative relation with said driving wheel, a pivoted brake actuator mounted on said platform, means mounting a brake-axle device to said driving wheel in eccentric relation to the axis of said driving wheel, means connecting said flat spring means at the other end of said platform to said device, the rotation of said wheel in response to flexing of said flat spring means being accompanied by a longitudinal shifting motion of said driving wheel, and chain means connecting said pivoted brake actuator to said brake-axle device, said chain means including a tension spring avoiding the formation of slack in said chain in response to bodily reciprocation of said driving wheel.

5. A bicycle according to claim 4, characterized in that said last named means includes a chain connected at one end to said pivoted brake actuator and extending in encircling relation to said brake-axle device, the other end of said chain being connected by said tension spring to an intermediate point in said chain.

6. A bicycle, including a frame providing a riding platform disposed longitudinally of the wheels of the bicycle, one of said wheels being the driving wheel, flat spring means attached to said platform and extending to cooperative relation with said driving wheel, a brake-axle device eccentrically carried by said driving wheel, bracket means interconnecting said flat spring means and said device, said bracket means including a bracket having a first surface parallel to the plane of the driving wheel and having a slot receiving said device for relative rotary and limited relative sliding movement, said bracket having a second surface fixed to said flat spring means, said second surface being in a parallel adjacent plane to the plane of said flat spring means, and said bracket having a third surface interconnecting said first and second surfaces.

7. A bicycle according to claim 6, characterized by a brake arm mounted on said brake-axle device and extending toward the other wheel, and means connecting said brake arm to the said second surface of said bracket.

8. A bicycle, including a frame providing a riding platform disposed longitudinally of the wheels of the bicycle, one of said wheels being the driving wheel, flat spring means attached to said platform and extending to cooperative relation with said driving wheel, a brake-axle device eccentrically carried by said driving wheel, bracket means interconnecting said flat spring means and said device, and discs on the opposite sides of said driving wheel mounting said device therebetween and connected to said device for unison rotary motion, said device extending through said discs to engage said bracket means, said bracket means comprising a pair of brackets, one on each side of said driving wheel.

9. A bicycle according to claim 8, characterized in that said discs are mounted to said driving wheel by spokes extending from the periphery of the discs to the rim of the wheel, said spokes being all of equal length positioning said discs in the center of the wheel.

10. A bicycle, including a frame providing a riding platform disposed longitudinally of the wheels of the bicycle, one of said wheels being the driving wheel, a pair of cone shaped discs concentrically disposed relative to one another and to said driving wheel, spokes connecting the peripheral edges of said discs to the rim of said driving wheel, a brake-axle device eccentrically carried by and between said discs, and leaf spring means connecting said platform to said device.

11. A bicycle, including a frame, a riding platform, longitudinally spaced wheels, said platform having a connection to said frame and being disposed longitudinally of the wheels to normally position substantially parallel to ground surface, one of said wheels being the driving wheel, a pair of cone-like discs concentrically disposed relative to one another and to said driving wheel on opposite sides of said driving wheel, said discs being fixed relative to said driving wheel, each disc terminating in an apex portion aligned with the apex portion of the opposing disc and offset relative to its center, said apex portions having through openings, axle means installed in said discs to have ends thereof project through said openings therein, brackets dependent from said axle means and terminating in portions disposing in a plane substantially parallel to ground surface, and spring means extending between and interconnecting said riding platform and said portions of said brackets.

12. A bicycle according to claim 11, characterized by means in the connection between said spring means and said brackets for relatively positioning and aligning said driving wheel.

13. A bicycle according to claim 11, characterized by means in the connection between said spring means and said brackets for changing the longitudinal position of the driving wheel relative to the riding platform, thus adapting the riding characteristics to the needs or desires of individual riders.

14. A bicycle according to claim 11, characterized in that said discs are fixed to said driving wheel by spokes extending from the periphery of the discs to the rim of the wheel, said spokes being all of equal length positioning said discs in the center of the wheel.

15. A bicycle comprising wheels, a frame including a riding platform disposed longitudinally of said wheels, one of said wheels being the driving wheel, axle means disposed in said driving wheel eccentrically of the center of the wheel, spring means connecting said riding platform to said axle means, said axle means having limited motion in a longitudinal sense relative to said platform under flexing of said spring means, said axle means including a brake which when applied inhibits rotation of said driving wheel, flexible means extending from said riding platform to actuate the brake, and means to maintain a taut condition of said flexible means as against the said limited bodily longitudinal movement of said axle means.

16. A bicycle, including a frame, a pair of wheels in tandem relation, one supported by said frame which has a relatively fixed mounting thereon and the other being the driving wheel, a riding platform disposed between said wheels attached at its one end to said frame, said platform including flat spring means extending as the other end thereof toward cooperative relation with said driving wheel, said flat spring means being co-planar, spoke mounted, cone-like disc means in the center of said driving wheel, means connecting said flat spring means at the said other end of said platform to said cone-like disc means at a location offset from the center thereof and providing for accommodation of relative bodily shifting longitudinal motion of the driving wheel in rotation thereof.

References Cited
UNITED STATES PATENTS

| | | | |
|---|---|---|---|
| 1,568,412 | 1/1926 | Parkes | 280—87.04 |
| 1,705,540 | 3/1929 | Rumley | 280—229 |
| 1,910,527 | 5/1933 | Dormoy | 188—26 X |
| 2,086,471 | 7/1937 | Chapman | 280—229 |
| 2,125,568 | 8/1938 | Huyssen et al. | 280—229 |
| 2,815,222 | 12/1957 | Harrison | 280—261 |

KENNETH H. BETTS, *Primary Examiner.*